Sept. 2, 1924.

B. G. VAUGHAN

MATCHMAKING MACHINE

Filed Dec. 14, 1922

INVENTOR

B. G. Vaughan.
By Bakewell & Cluck
ATTORNEYS

Sept. 2, 1924.  1,506,958
B. G. VAUGHAN
MATCHMAKING MACHINE
Filed Dec. 14, 1922  2 Sheets-Sheet 2
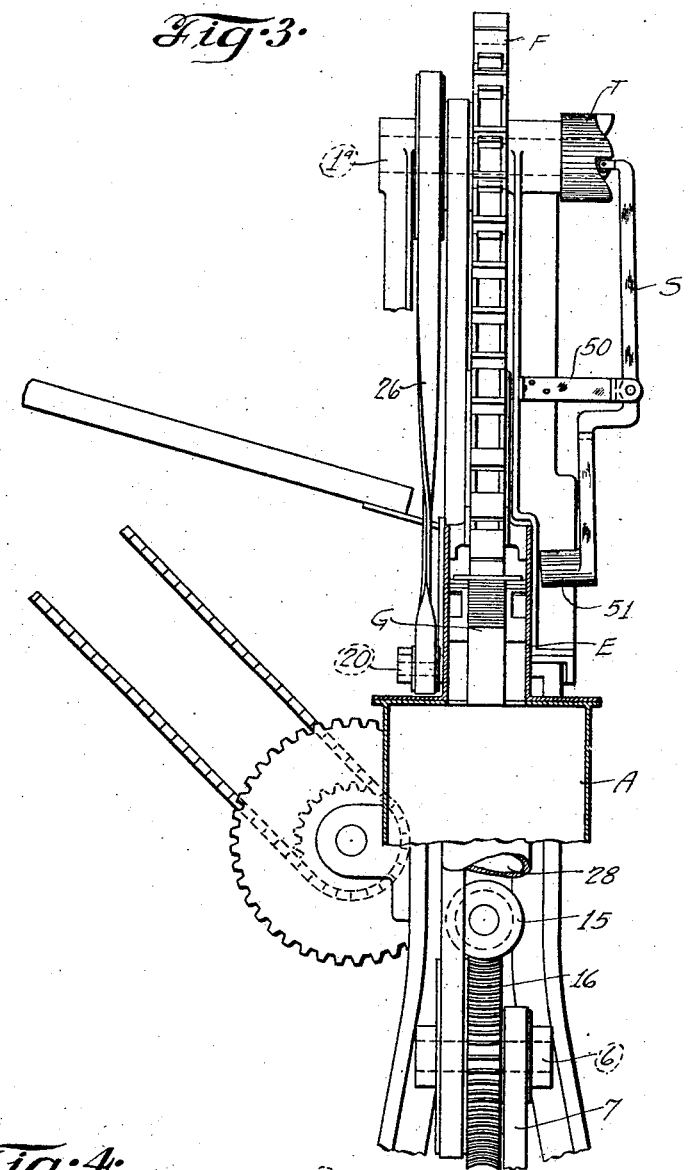
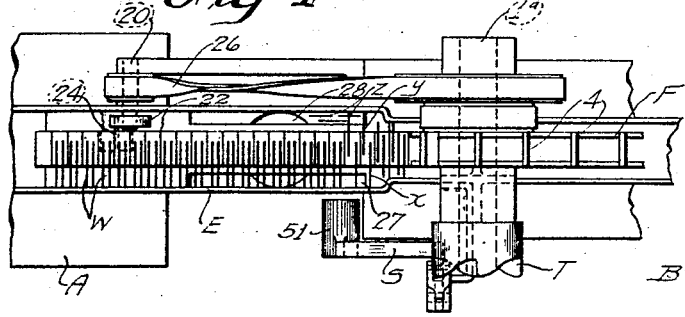
INVENTOR
B. G. Vaughan.
By Bakewell & Church
ATTORNEYS Patented Sept. 2, 1924.

1,506,958

UNITED STATES PATENT OFFICE.

BERNARD G. VAUGHAN, OF JOLIET, ILLINOIS, ASSIGNOR TO NATIONAL MATCH COMPANY, OF JOLIET, ILLINOIS, A CORPORATION OF ILLINOIS.

MATCHMAKING MACHINE.

Application filed December 14, 1922. Serial No. 607,000.

*To all whom it may concern:*

Be it known that I, BERNARD G. VAUGHAN, a citizen of the United States, residing at Joliet, Illinois, have invented a certain new and useful Improvement in Matchmaking Machines, of which the following is a full, clear, and exact description, such as will enable others skilled in the art to which it appertains to make and use the same.
This invention relates to a match making machine of the particular kind described in my pending application for patent for match making machine, Serial No. 578,198, filed July 28, 1922, namely, a match making machine that is provided with mechanism for taking match splints from a source of supply and feeding them directly into the hopper of the machine which supplies splints to the setting head that inserts the splints in the endless carrier that moves the splints through tanks containing substances that are used to treat the splints and form the heads of the matches.

In a machine that forms the subject-matter of my said application the match splints are taken from a source of supply and introduced into a trough in such a way that they extend transversely of the trough. Thereafter, the splints are moved longitudinally of the trough by an endless feeding device, and when they reach one end of the trough, they are discharged from same directly into the hopper of the machine that supplies the splints to the setting head. The trough is reciprocated endwise so as to arrange the splints in parallel relation, and the trough is provided at its discharge end with a vibrating feeding member that tends to throw the splints upwardly and forwardly towards the hopper. In order that improperly positioned splints which extend longitudinally of the trough will escape from the trough before reaching the hopper, openings are formed in the bottom of the trough at each side of said vibrating feeding member.

The object of my present invention is to improve the splint feeding mechanism of the machine described in my said application by constructing it in such a way that improperly positioned splints which extend lengthwise of the trough will be sure to escape from said trough before reaching the hopper of the machine.

To this end I have devised a splint feeding mechanism for match making machines, which, in addition to comprising all of the desirable features and characteristics of the splint feeding mechanism of the machine described in my said application, is provided with means for causing the parallel splints that extend transversely of the trough to assume such a position, in traveling through the discharge end portion of the trough, that they will not obstruct an opening provided in the bottom of the trough for the escape of improperly positioned, longitudinally-disposed splints.

Figure 1 of the drawings is a side elevational view, partly broken away, of a match splint feeding mechanism constructed in accordance with my present invention.

Figure 3 is an enlarged end elevational view of said match splint feeding mechanism, the hopper being shown in vertical section; and

Figure 4 is a top plan view of a portion of said match splint feeding mechanism, illustrating the vibrating feeding member in the discharge end portion of the trough and means that is used for subjecting the trough to such action as to cause the parallel splints to assume such a position that they will not prevent the escape of the improperly positioned, longitudinally-disposed splints.

Figures 1, 2:
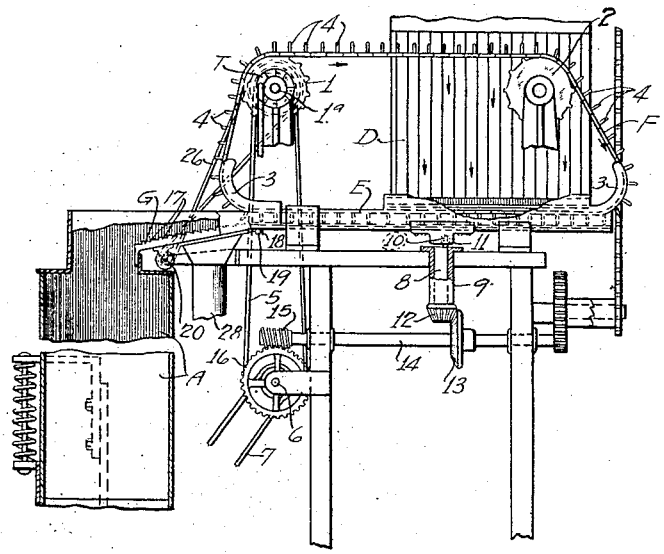
Figure 2 is a side elevational view of a portion of the match splint hopper and the discharge end portion of the trough through which the splints are fed into the hopper.

Referring to the drawings which illustrate the preferred form of my invention, A designates the vertically-disposed hopper of a match making machine of the type that is provided with a reciprocating setting head (not shown) for receiving match splints from the lower end of the hopper A and inserting the splints in an endless carrier (not shown) that dips the splints in the solution that is used to treat the splints and form the heads of the matches, D designates inclined chutes into which match splints are delivered from a source of supply, E designates a horizontally-disposed trough into which the splints are discharged from the chutes D in such a way that they extend transversely of said trough, and F designates as an entirety a feeding device for feeding the splints longitudinally through the trough towards the upper end of the hopper A, the feeding device F herein illustrated consisting of an endless sprocket chain extending around sprocket wheels 1 and 2 over guides 3 on the trough and provided with fingers 4 that project downwardly into the trough E. Any suitable means can be used for operating the feeding device F, such, for example, as a belt 5 that passes around a pulley on a shaft 1ª to which the sprocket wheel 1 is connected and also passes around a pulley on a shaft 6 that is driven from any suitable source of power, such as a drive belt 7, as shown in Figure 1.

The trough E is provided in its discharge end portion with a vibrating feeding member G and means is provided for reciprocating said trough endwise and also for rocking the vibrating feeding member G vertically so that it will tend to throw the match splints upwardly and forwardly into the hopper A. In the form of my invention herein illustrated the means for reciprocating the trough endwise consists of a vertically-disposed shaft 8 rotatably mounted in a stationary bearing 9 and provided at its upper end with an eccentrically-disposed pin 10 that projects into a hole in a member 11 on the underside of the trough E, the rotary movement of said shaft 8 causing the trough to be reciprocated endwise when the shaft 8 is in operation, said shaft 8 being driven by a beveled gear 12 that meshes with a beveled pinion 13 on a horizontally-disposed shaft 14 provided with a worm 15 that meshes with a worm gear 16 on the drive shaft 6. The vibrating feeding member G consists of a downwardly-inclined bar arranged in a slot in the bottom of the discharge end portion of the trough E and provided in its upper edge with teeth or notches 17 which tend to feed the splints forwardly towards the hopper A when the mechanism is in operation, the member G being pivotally mounted on the trough E in any suitable manner, as, for example, by means of a projection 18 on said member that passes through an eye 19 on the bottom of the trough, as shown in Figure 2. The vibrating feeding member G is herein illustrated as being rocked vertically by a means composed of a horizontally-disposed shaft 20 mounted in a stationary bearing and provided with a disk 22 that is equipped with a laterally-projecting, eccentrically-disposed pin 24 that fits in a bearing 25 on the underside of the member G, as shown in Figure 2, a portion of the bottom of the trough E being broken away, as shown in Figure 4, so as to show the disk 22. The shaft 20 is driven by a belt 26 that passes around a pulley connected to the drive shaft 1ª of the splint feeding device F so as to cause the free end of the member G to rock upwardly and downwardly when the splint feeding device F is in operation.

The discharge portion of the trough E in which the vibrating feeding member G is arranged is wider than the portion of the trough into which the match splints are introduced from the chutes D, and openings 27 are formed in the bottom of said discharge portion at opposite sides of the vibrating member G, so as to permit improperly positioned splints that extend longitudinally of the trough to escape through one of said openings into a suction conduit 28 provided with a funnel-shaped portion that is arranged underneath the openings 27. Owing to the fact that the discharge portion of the trough E is of greater width than the length of the match splints, there is a tendency for the parellel splints to assume a staggered relation while traveling through this portion of the trough, thereby obstructing or partially obstructing the openings 27, and accordingly, preventing the escape of improperly positioned splints through said openings. In other words, when the match splints enter the relatively wide discharge portion of the trough E, some of the parallel splints move to the right so that the ends of same bear against the right hand side wall of the trough, and some of the parallel splints move to the left so that the ends of same bear against the left hand side wall of the trough, as indicated by the splints designated $x$ and $y$ in Figure 4, thereby obstructing the openings 27 in the bottom of the trough to such an extent that the longitudinally-disposed, improperly positioned splints cannot escape through said openings. In order to overcome this tendency of the splints to assume a staggered relation while traveling through the portion of the trough E provided with the openings 27, I have provided the splint feeding mechanism with means for causing the parallel splints to assume such a position in traveling through the discharge end portion of the trough that they will not retard or interfere with the escape of improperly positioned, longitudinally-disposed splints $z$ through one of the openings 27 in the bottom of the trough. Various means can be used for accomplishing this result, but I have found that if the discharge end portion of the trough E is subjected to a slight sidewise vibratory motion the properly positioned, parallel splints, designated by the reference character $w$ in Figure 4, will tend to collect at one side of the relatively wide discharge portion of the trough in traveling through same, ...ereby maintaining the opening 27 at the other side of the trough in such a condition that the improperly positioned, longitudinally-disposed splints $z$ can escape freely through same. It is immaterial what means is used for agitating the trough E sidewise or in a horizontal direction so as to cause the parallel, transversely-disposed splints to assume such a position in traveling through the discharge portion of the trough that they do not interfere with the escape of the longitudinally disposed splints z, but I prefer to equip the splint feeding mechanism with a bumping device S that strikes against one side of the discharge portion of the trough E intermittently, and thus vibrates, bumps or agitates said trough in such a way as to overcome the tendency of the parallel splints to assume a staggered relation in traveling through the discharge portion of the trough, the device S herein illustrated consisting of a lever pivotally mounted on a stationary support 50 and provided at its lower end with a lateral projection 51 that strikes against one of the side walls of the discharge portion of the trough E, and a cam T on the shaft 1ª that drives the splint feeding device F which co-operates with the upper end of the lever S to bump the trough E intermittently during the operation of feeding the splints longitudinally through said trough.

Having thus described my invention, what I claim as new and desire to secure by Letters Patent is:

1. A splint feeding mechanism for match making mechines, comprising a trough for receiving match splints that are arranged transversely of the trough, means for feeding the splints longitudinally through said trough, an opening in the bottom of the trough for permitting the escape of longitudinally-disposed splints, and means for causing the transversely-disposed splints to move endwise from over said opening so as not to obstruct said opening or retard the escape of the longitudinally-disposed splints through same.

2. A match splint feeding mechanism for match making machines, comprising a trough having a relatively wide portion provided in its bottom with an opening through which improperly positioned splints can escape from the trough, said trough being adapted to receive splints that are disposed transversely of the trough, means for feeding the splints longitudinally of the trough, and means for agitating the trough transversely of itself so as to cause the transversely-disposed splints to move endwise away from said opening in traveling through the wide portion of the trough and thus not retard the escape of the improperly positioned splints through said openings.

3. A match splint feeding mechanism, comprising a trough for receiving match splints that are arranged transversely of the trough, an opening in the bottom of the trough for permitting the escape of improperly positioned, longitudinally-disposed splints, and means for jarring or agitating the trough transversely of itself so as to cause the transversely-disposed splints to move endwise away from said opening and thus not interfere with the escape of improperly positioned splints through said opening.

4. A match splint feeding mechanism, comprising a trough adapted to receive match splints that are positioned transversely of the trough, means for feeding match splints through said trough, said trough having a relatively wide portion provided in its bottom with an opening for permitting the escape of improperly positioned, longitudinally-disposed splints, and an intermittently operating bumping device that acts on the trough and causes the transversely-disposed splints to move endwise away from said opening so as not to interfere with the escape of the improperly positioned splints through said opening.

5. A match splint feeding mechanism for match making machines, comprising a trough adapted to receive match splints that are disposed transversely of the trough, a hopper into which the splints are discharged from said trough, means for feeding the splints longitudinally of the trough towards said hopper, a discharge opening in the trough for permitting the escape of improperly positioned, longitudinally-disposed splints, and means for agitating the trough so as to cause the transversely-disposed splints to move away from said opening and thus permit the improperly positioned splints to escape through said opening.

6. A match splint feeding mechanism for match making machines, comprising a trough adapted to receive match splints that are positioned transversely of the trough, a hopper into which splints are discharged from said trough, means for feeding the splints longitudinally through said trough, a vibrating feeding member in the discharge portion of the trough, an opening in the bottom of the trough adjacent said vibrating feeding member for permitting the escape of improperly positioned, longitudinally-disposed splints, and an agitating device that acts on the trough intermittently and moves it transversely of itself so as to cause the transversely-disposed splints to move endwise from over said opening and thus insure the escape of improperly positioned splints through said opening.

7. A match making machine, comprising a match splint hopper, a trough adapted to receive match splints that are positioned transversely of the trough, mechanism for feeding splints longitudinally through said trough towards said hopper, a vibrating feeding member in the discharge portion of the trough that tends to move the splints towards said hopper, an opening in the trough for permitting the escape of improperly positioned, longitudinally-disposed splints, and means operated by said feeding mechanism for agitating the trough transversely of itself so as to cause the transversely-disposed splints to move endwise from over said opening and thus permit the escape of the improperly positioned splints through said opening.

BERNARD G. VAUGHAN.